US010033438B2

United States Patent
Tsukamoto et al.

(10) Patent No.: US 10,033,438 B2
(45) Date of Patent: Jul. 24, 2018

(54) POWER SUPPLY APPARATUS, CONTROL METHOD, AND RECORDING MEDIUM

(71) Applicant: CANON KABUSHIKI KAISHA, Tokyo (JP)

(72) Inventors: Nobuyuki Tsukamoto, Tokyo (JP); Marie Tateno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/786,324

(22) Filed: Oct. 17, 2017

(65) Prior Publication Data

US 2018/0041255 A1 Feb. 8, 2018

Related U.S. Application Data

(63) Continuation of application No. 14/509,524, filed on Oct. 8, 2014, now Pat. No. 9,819,398.

(30) Foreign Application Priority Data

Oct. 9, 2013 (JP) .................................. 2013-211992

(51) Int. Cl.
| | |
|---|---|
| *H04B 5/00* | (2006.01) |
| *H02J 5/00* | (2016.01) |
| *H02J 7/02* | (2016.01) |
| *H02J 7/00* | (2006.01) |
| *H02J 50/12* | (2016.01) |
| *H02J 50/80* | (2016.01) |

(52) U.S. Cl.
CPC ............ *H04B 5/0037* (2013.01); *H02J 5/005* (2013.01); *H02J 7/025* (2013.01); *H02J 50/12* (2016.02); *H02J 50/80* (2016.02); *H04B 5/0031* (2013.01); *H04B 5/0056* (2013.01); *H02J 2007/0001* (2013.01)

(58) Field of Classification Search
CPC .. H04B 5/0037; H04B 5/0056; H04B 5/0031; H02J 5/005; H02J 7/025; H02J 50/12; H02J 50/80; H02J 2007/0001
USPC ........................................................ 307/104
See application file for complete search history.

(56) References Cited

U.S. PATENT DOCUMENTS

2013/0211607 A1* 8/2013 Takemura ................ H04B 3/54
700/286

* cited by examiner

*Primary Examiner* — Jared Fureman
*Assistant Examiner* — Win Htun
(74) *Attorney, Agent, or Firm* — Canon U.S.A., Inc. IP Division (57) ABSTRACT

A power supply apparatus includes a power supply unit that wirelessly supplies power to an electronic apparatus, a communication unit that performs wireless communication for acquiring status information from the electronic apparatus, a detection unit that detects an external apparatus different from the electronic apparatus, and a control unit that causes the communication unit to disconnect wireless communication with the electronic apparatus in response to a detection of the external apparatus by the detection unit if the power supply unit is wirelessly supplying power to the electronic apparatus based on the status information acquired from the electronic apparatus, and causes the communication unit to perform wireless communication with the external apparatus to determine whether the external apparatus is able to wirelessly receive power.

10 Claims, 7 Drawing Sheets

POWER SUPPLY APPARATUS, CONTROL METHOD, AND RECORDING MEDIUM

RELATED APPLICATIONS

This application is a Continuation of U.S. patent application Ser. No. 14/509,524 filed on Oct. 8, 2014, which claims the benefit of Japanese Application No. 2013-211992, filed Oct. 9, 2013, which are hereby incorporated by reference herein in their entirety.

BACKGROUND

Field

Aspects of the present invention generally relate to a power supply apparatus that wirelessly supplies power.

Description of the Related Art

In recent years, there has been known a power supply system including a power supply apparatus that wirelessly supplies power without being connected to an electronic apparatus via a connector, and the electronic apparatus that receives the power wirelessly supplied from the power supply apparatus. Japanese Patent Application Laid-Open No. 2010-39283 discusses this kind of power supply system, in which an electronic apparatus charges a battery thereof with use of power supplied from a power supply apparatus.

However, no disclosure has been made about how communication is performed between the power supply apparatus and the electronic apparatus, and the power supply apparatus controls the wireless power supply with use of a result of the communication with the electronic apparatus in this kind of power supply system. Therefore, no consideration has been given to at what timing the power supply apparatus should start authentication for realizing the communication with the electronic apparatus, whereby the power supply apparatus has been unable to appropriately control the timing at which the power supply apparatus performs the authentication for realizing the communication with the electronic apparatus.

SUMMARY

Aspects of the present invention are generally directed to a power supply apparatus that controls a timing at which the power supply apparatus authenticates communication with an electronic apparatus, thereby realizing appropriate execution of the communication that allows the power supply apparatus to control wireless power supply to the electronic apparatus.

According to an aspect of the present invention, a power supply apparatus includes a power supply unit that wirelessly supplies power to an electronic apparatus, a communication unit that performs wireless communication for acquiring status information from the electronic apparatus, a detection unit that detects an external apparatus different from the electronic apparatus, and a control unit that causes the communication unit to disconnect wireless communication with the electronic apparatus in response to a detection of the external apparatus by the detection unit if the power supply unit is wirelessly supplying power to the electronic apparatus based on the status information acquired from the electronic apparatus, and causes the communication unit to perform wireless communication with the external apparatus to determine whether the external apparatus is able to receive wirelessly power.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

In the following description, a first exemplary embodiment will be described with reference to the drawings.

Figure 1:
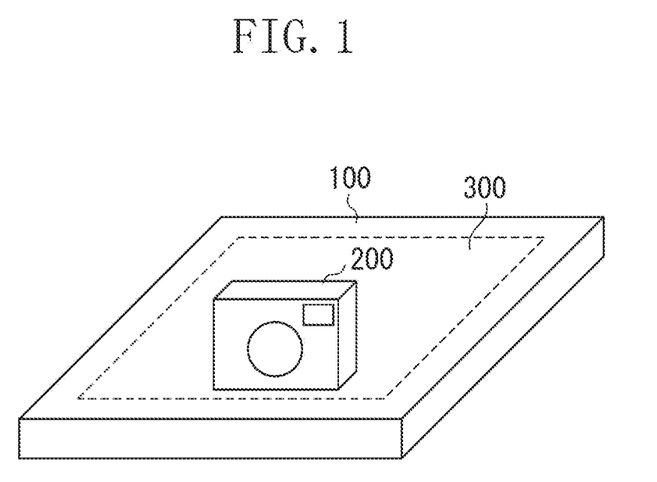
FIG. 1 illustrates an example of a wireless power supply system according to a first exemplary embodiment.

As illustrated in FIG. 1, a power supply system according to the first exemplary embodiment includes a power supply apparatus 100 and an electronic apparatus 200. In the power supply system according to the first exemplary embodiment, the power supply apparatus 100 wirelessly supplies power to the electronic apparatus 200 when the electronic apparatus 200 is located in a predetermined range 300 in the power supply apparatus 100. Further, the electronic apparatus 200 can wirelessly receive the power output from the power supply apparatus 100 when the electronic apparatus 200 is located in the predetermined range 300. On the other hand, the electronic apparatus 200 cannot receive the power from the power supply apparatus 100 when the electronic apparatus 200 is not located in the predetermined range 300. The predetermined range 300 is a range that allows the power supply apparatus 100 to communicate with the electronic apparatus 200. The predetermined range 300 is set to a range on a housing of the power supply apparatus 100, but is not limited thereto. The power supply apparatus 100 can wirelessly supply power to a plurality of power receiving apparatuses. The power receiving apparatus means an apparatus that can wirelessly receive power from the power supply apparatus 100, and the electronic apparatus 200 is also included in the power receiving apparatus.

The electronic apparatus 200 may be an imaging apparatus or a playback apparatus, or may be a communication apparatus such as a mobile phone or a smartphone. Further, the electronic apparatus 200 may be a battery pack including a battery. Further, the electronic apparatus 200 may be an automobile or a display, or may be a personal computer.

Figure 2:
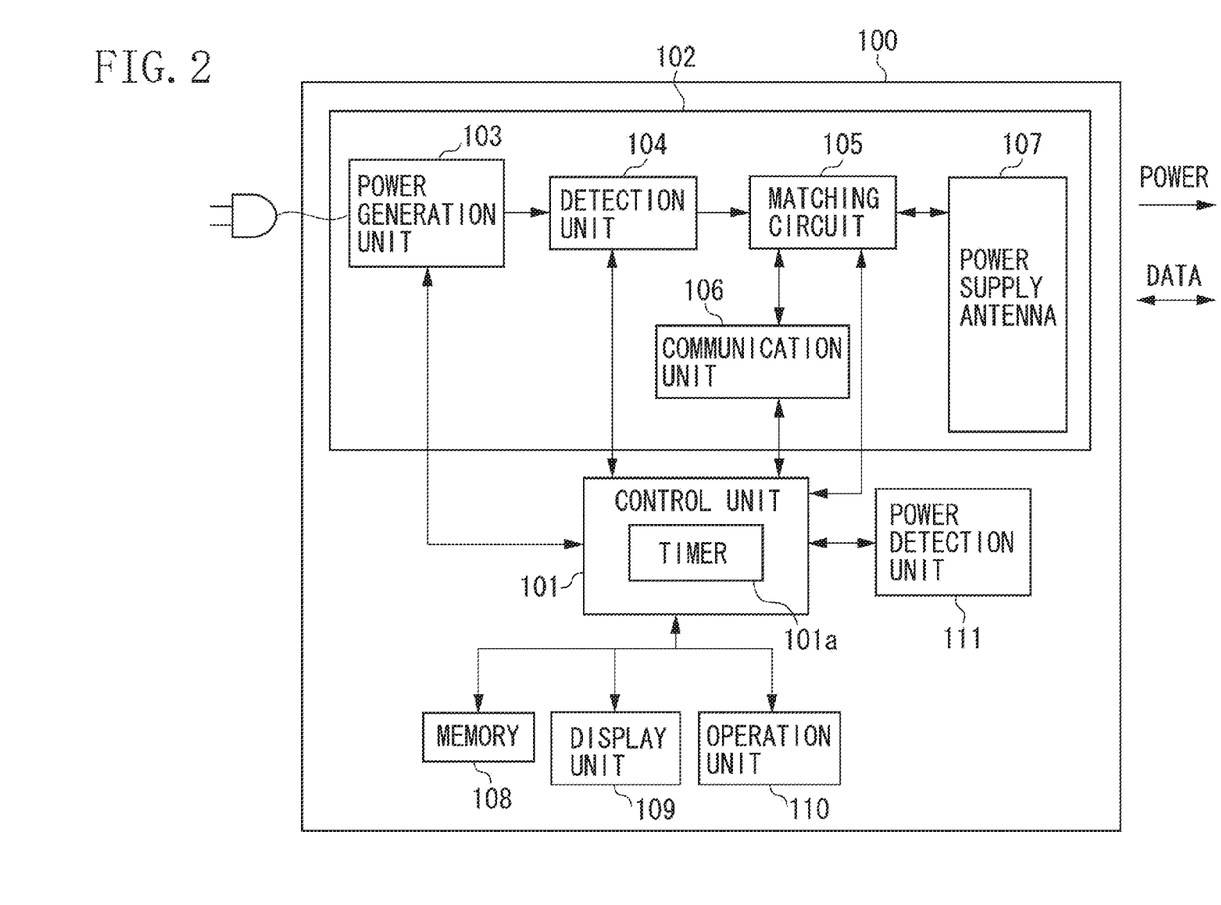
FIG. 2 is a block diagram illustrating an example of a power supply apparatus according to the first exemplary embodiment.

Next, an example of a configuration of the power supply apparatus 100 according to the first exemplary embodiment will be described with reference to FIG. 2. As illustrated in FIG. 2, the power supply apparatus 100 includes a control unit 101, a power supply unit 102, a memory 108, a display unit 109, an operation unit 110, and a power detection unit 111. The power supply unit 102 includes a power generation unit 103, a detection unit 104, a matching unit 105, a communication unit 106, and a power supply antenna 107.

The control unit 101 controls the power supply apparatus 100 by executing a computer program recorded in the memory 108. The control unit 101 includes, for example, a central processing unit (CPU). The control unit 101 is realized by hardware. Further, the control unit 101 includes a timer 101a.

The power supply unit 102 is used to wirelessly supply power based on a predetermined power supply method. The predetermined power supply method is, for example, a power supply method using the magnetic resonance method. The magnetic resonance method is a method that transmits power from the power supply apparatus 100 to the electronic apparatus 200 in such a state that resonance occurs between the power supply apparatus 100 and the electronic apparatus 200. The state in which resonance occurs between the power supply apparatus 100 and the electronic apparatus 200 corresponds to a state in which a resonance frequency of the power supply antenna 107 of the power supply apparatus 100 and a resonance frequency of a power receiving antenna 203 of the electronic apparatus 200 are the same. The predetermined power supply method may be a power supply method using another method than the magnetic resonance method.

The power generation unit 103 generates power to be output outward via the power supply antenna 107 with use of power supplied from a not-illustrated alternating-current (AC) power source.

As the power generated by the power generation unit 103, there are first power and second power. The first power is used when the communication unit 106 communicates with the electronic apparatus 200. The first power is, for example, low power of 1 W or lower. The first power may be power specified under a communication standard of the communication unit 106. The second power is used when the electronic apparatus 200 is charged or performs a specific operation. The second power is, for example, power of 2 W or higher. Further, the second power is not limited to power of 2 W or higher, as long as it is higher than the first power. A value of the second power is set by the control unit 101.

The power generated by the power generation unit 103 is supplied to the power supply antenna 107 via the detection unit 104 and the matching circuit 105.

The detection unit 104 detects a voltage standing wave ratio (VSWR). Further, the detection unit 104 provides data indicating the detected VSWR to the control unit 101. The VSWR is a value indicating a relationship between a traveling wave of the power output from the power supply antenna 107 and a reflecting wave of the power output from the power supply antenna 107. The control unit 101 can detect whether at least one power receiving apparatus is located in the predetermined range 300 with use of the data indicating the VSWR, which is provided by the detection unit 104.

The matching circuit 105 includes a circuit that sets the resonance frequency of the power supply antenna 107.

When the power supply apparatus 100 outputs at least one of the first power and the second power via the power supply antenna 107, the control unit 101 controls the matching circuit 105 in such a manner that the matching circuit 105 sets the resonance frequency of the power supply antenna 107 to a predetermined frequency f. The predetermined frequency f is, for example, 13.56 MHz. Further, the predetermined frequency f may be 6.78 MHz, or may be a frequency specified under the communication standard of the communication unit 106.

The communication unit 106 performs proximity wireless communication based on, for example, the Near Field Communication (NFC) standard defined by the NFC forum. Further, a communication standard of the communication unit 106 may be the International Organization for Standardization/International Electrotechnical Commission (ISO/IEC) 18092 standard, the ISO/IEC 14443 standard, or the ISO/IEC 21481 standard.

The communication unit 106 has the Reader/Writer mode and the Peer to Peer (P2P) mode defined in the NFC standard as communication modes thereof.

An operation when the communication unit 106 is in the Reader/Writer mode will be described now. The Reader/Writer mode corresponds to the Card Emulation mode defined in the NFC standard. When the communication unit 106 is in the Reader/Writer mode, the communication unit 106 communicates with a power receiving apparatus in the Card Emulation mode based on the NFC standard.

When the communication unit 106 is in the Reader/Writer mode, the communication unit 106 transmits and receives data according to NFC Data Exchange Format (NDEF) to and from the power receiving apparatus in the Card Emulation mode with use of the first power.

When the communication unit 106 is in the Reader/Writer mode, the communication unit 106 cannot communication with a power receiving apparatus in the P2P mode.

When the communication unit 106 is in the Reader/Writer mode, the communication unit 106 neither transmits nor receives data according to the NDEF format to and from the power receiving apparatus in the Card Emulation mode via the power supply antenna 107 while the second power is output from the power supply antenna 107.

An operation when the communication unit 106 is in the P2P mode will be described now. When the communication unit 106 is in the P2P mode, the communication unit 106 communicates with a power receiving apparatus in the P2P mode based on the NFC standard.

When the communication unit 106 is in the P2P mode, the communication unit 106 transmits and receives data according to the NDEF format to and from the power receiving apparatus in the P2P mode with use of the first power.

When the communication unit 106 is in the P2P mode, the communication unit 106 neither transmits nor receives data according to the NDEF format to and from the power receiving apparatus in the P2P mode via the power supply antenna 107 while the second power is output from the power supply antenna 107.

Hereinafter, a time period during which the second power is output from the power supply antenna 107 will be referred to as a "predetermined time period". The predetermined time period is, for example, set by the control unit 101.

The power supply antenna 107 is an antenna for outputting at least one of the first power and the second power. Further, the power supply antenna 107 is used when the communication unit 106 performs wireless communication with use of the NFC standard.

The computer program for controlling the power supply apparatus 100 is recorded in the memory 108. Further, data for identifying the power supply apparatus 100, a power supply parameter regarding the power supply apparatus 100, a flag for controlling power supply, and the like are recorded in the memory 108. Further, data received by the communication unit 106 is recorded in the memory 108.

The display unit 109 displays video data provided from the memory 108.

The operation unit 110 provides a user interface that allows a user to operate the power supply apparatus 100. The operation unit 110 includes a button, a switch, a touch panel, and the like that allow the user to operate the power supply apparatus 100. The control unit 101 controls the power supply apparatus 100 according to an input signal input via the operation unit 110.

The power detection unit 111 detects the power output from the power supply antenna 107, and provides data indicating the detected power to the control unit 101.

The power supply apparatus 100 is configured to wirelessly supply power. However, the term "wirelessly" may be replaced with the phrase "in a non-contact manner" or the phrase "in a contactless manner".

Figure 3:
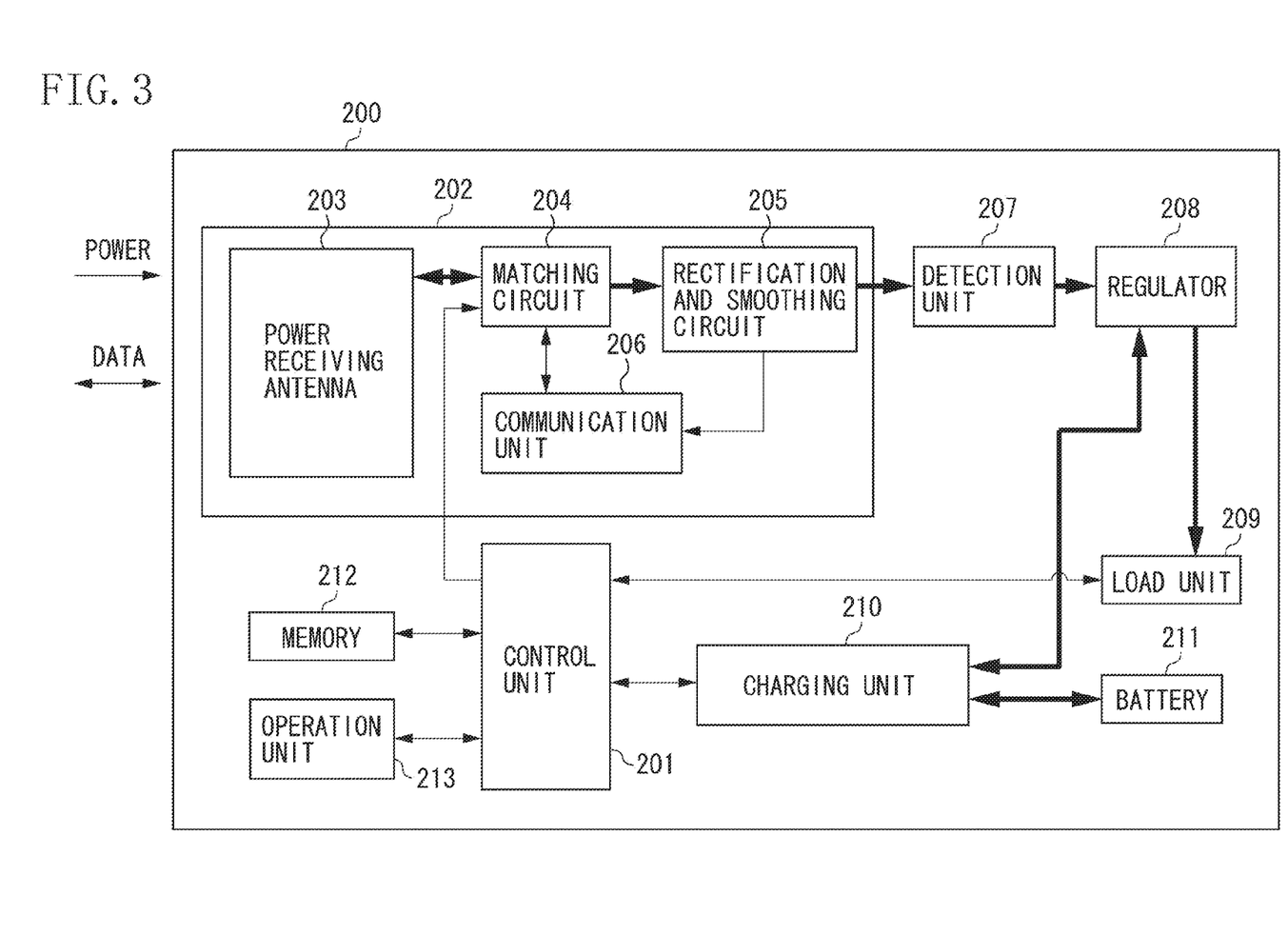
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes a control unit 201, a power receiving unit 202, a detection unit 207, a regulator 208, a load unit 209, a charging unit 210, a battery 211, a memory 212, and an operation unit 213. The power receiving unit 202 includes the power receiving antenna 203, a matching circuit 204, a rectification and smoothing circuit 205, and a communication unit 206.

The control unit 201 controls the electronic apparatus 200 by executing a computer program recorded in the memory 212. The control unit 201 includes, for example, a CPU. The control unit 201 is realized by hardware.

The power receiving unit 202 supports the predetermined power supply method, and is used to wirelessly receive power from the power supply apparatus 100.

The power receiving antenna 203 is an antenna for receiving the power supplied from the power supply apparatus 100. Further, the power receiving antenna 203 is used when the communication unit 206 communicates with the power supply apparatus 100 with use of the NFC standard. The power received by the electronic apparatus 200 from the power supply apparatus 100 via the power receiving antenna 203 is supplied to the rectification and smoothing circuit 205 via the matching circuit 204.

The matching circuit 204 includes a circuit that sets the resonance frequency of the power receiving antenna 203. The control unit 201 can set the resonance frequency of the power receiving antenna 203 to the same frequency as the resonance frequency of the power supply antenna 107 by controlling the matching circuit 204.

The rectification and smoothing circuit 205 generates direct-current power from the power received by the power receiving antenna 203. Further, the rectification and smoothing circuit 205 supplies the generated direct-current power to the regulator 208 via the detection unit 207. If data is superimposed on the power received by the power receiving antenna 203, the data removed from the power received by the power receiving antenna 203 is provided to the communication unit 206.

The communication unit 206 communicates with the power supply apparatus 100 based on the same communication standard as the communication standard of the communication unit 106.

The communication unit 206 analyzes the data provided from the rectification and smoothing circuit 205. After analyzing, the communication unit 206 transmits data requested from the power supply apparatus 100 to the power supply apparatus 100, and records the data received from the power supply apparatus 100 with use of a result of the analysis of the data. Further, the communication unit 206 transmits response data corresponding to the data provided from the rectification and smoothing circuit 205 to the power supply apparatus 100.

The communication unit 206 has at least one of the Card Emulation mode and the P2P mode as communication modes thereof.

The detection unit 207 detects the power received via the power receiving antenna 203, and provides data indicating the detected power to the control unit 201.

The regulator 208 supplies at least one of the power supplied from the rectification and smoothing circuit 205 and power supplied from the battery 211 to the respective units of the electronic apparatus 200 according to an instruction issued from the control unit 201.

The load unit 209 includes an imaging unit that generates video data such as a still image and a moving image from an optical image of an object, a playback unit that plays back the video data, and the like.

When the electronic apparatus 200 is in a powered-on mode, power is supplied from the regulator 208 to the load unit 209. When the electronic apparatus 200 is in a powered-off mode or a standby mode, limited power is supplied from the regulator 208 to the load unit 209.

The charging unit 210 charges the battery 211. The charging unit 210 controls whether to charge the battery 211 with use of the power supplied from the regulator 208 or supply power discharged from the battery 211 to the regulator 208 according to an instruction issued from the control unit 201. The charging unit 210 periodically detects remaining capacity in the battery 211, and provides data indicating the remaining capacity in the battery 211 and data relating to charging of the battery 211 to the control unit 201.

The battery 211 is a secondary battery connectable to the electronic apparatus 200.

The memory 212 stores the computer program for controlling the electronic apparatus 200 and data such as parameters regarding the electronic apparatus 200.

The operation unit 213 provides a user interface that allows a user to operate the electronic apparatus 200. The control unit 201 controls the electronic apparatus 200 according to an input signal input via the operation unit 213.

<Control Process>

Next, control process for controlling whether to perform a digital protocol that will be described below again according to the first exemplary embodiment will be described with reference to FIG. 4. The control unit 101 executes the computer program stored in the memory 108, by which the control process can be realized. When being changed into a power supply mode for supplying power, the power supply apparatus 100 performs a process of step S401.

In step S401, the control unit 101 determines whether the power output from the power supply antenna 107 is less than or equal to a predetermined value during a first period. The predetermined value is a threshold value for determining whether the power output from the power supply antenna 107 is power lower than the first power. Further, the predetermined value may be a threshold value for determining whether the power supply apparatus 100 is placed into such a state that the communication unit 106 cannot perform communication with use of the power output via the power supply antenna 107.

In this case, for example, the control unit 101 determines whether the power output from the power supply antenna 107 is less than or equal to the predetermined value with use of the data provided from the power detection unit 111. If the power indicated by the data provided from the power detection unit 111 is less than or equal to the predetermined value during the first period, the control unit 101 determines that the power output from the power supply antenna 107 is less than or equal to the predetermined value during the first period (YES in step S401). In this case (YES in step S401), the process proceeds to step S405. If the power indicated by the data provided from the power detection unit 111 is not less than or equal to the predetermined value during the first period, the control unit 101 determines that the power output from the power supply antenna 107 is not less than or equal to the predetermined value during the first period (NO in step S401). In this case (NO in step S401), the process proceeds to step S402.

The first period includes a period since the first power is output from the power supply antenna 107 until the second power is output.

In step S402, the control unit 101 determines whether the power output from the power supply antenna 107 is less than or equal to the predetermined value during a second period. Also in this case, for example, the control unit 101 determines whether the power output from the power supply antenna 107 is less than or equal to the predetermined value with use of the data provided from the power detection unit 111 in a similar manner to step S401. If the power indicated by the data provided from the power detection unit 111 is less than or equal to the predetermined value during the second period, the control unit 101 determines that the power output from the power supply antenna 107 is less than or equal to the predetermined value during the second period (YES in step S402). In this case (YES in step S402), the process proceeds to step S405. If the power indicated by the data provided from the power detection unit 111 is not less than or equal to the predetermined value during the second period, the control unit 101 determines that the power output from the power supply antenna 107 is not less than or equal to the predetermined value during the second period (NO in step S402). In this case (NO in step S402), the process proceeds to step S403.

The second period includes a period since the second power is output from the power supply antenna 107 until the first power is output.

In step S403, the control unit 101 determines whether the number of power receiving apparatuses located in the predetermined range 300 increases. For example, the control unit 101 determines whether the number of power receiving apparatuses located in the predetermined range 300 increases with use of the VSWR data provided from the detection unit 104. If the control unit 101 determines that the number of power receiving apparatuses located in the predetermined range 300 increases (YES in step S403), the process proceeds to step S405. On the other hand, if the control unit 101 determines that the number of power receiving apparatuses located in the predetermined range 300 does not increase (NO in step S403), the process proceeds to step S404.

In step S404, the control unit 101 sets a re-authentication flag F stored in the memory 108 in such a manner that this flag is invalidated. The re-authentication flag F is data for controlling whether to perform the digital protocol, which will be described below, again. When the re-authentication flag F is set so as to be invalidated, the control unit 101 performs control so as not to perform the digital protocol again. If the re-authentication flag F is invalidated, the process ends.

For example, if the power output from the power supply antenna 107 is reduced less than the predetermined value and the communication unit 106 is able to exchange data according to the NDEF format with the electronic apparatus 200, power required for the communication unit 206 to perform communication may not be supplied from the power supply antenna 107 to the communication unit 206. In this case, the communication unit 106 cannot continuously communicate with the electronic apparatus 200.

Therefore, if the power output from the power supply antenna 107 is less than or equal to the predetermined value during the first period (YES in step S401), the power supply apparatus 100 should authenticate the communication by the communication unit 106 again together with the electronic apparatus 200 to appropriately wirelessly supply power to the electronic apparatus 200.

Therefore, if the power output from the power supply antenna 107 is less than or equal to the predetermined value during the second period (YES in step S402), the power supply apparatus 100 should authenticate the communication by the communication unit 106 again together with the electronic apparatus 200 to appropriately wirelessly supply power to the electronic apparatus 200.

For example, if another apparatus different from the electronic apparatus 200 is placed in the predetermined range 300 and the communication unit 106 is able to exchange data according to the NDEF format with the electronic apparatus 200, the communication unit 106 may not have authenticated communication with the other apparatus yet. In this case, once the power supply apparatus 100 starts wireless power supply to the electronic apparatus 200, this prevents the power supply apparatus 100 from checking a state of the other apparatus. As a result, even if the power supply apparatus 100 can appropriately wirelessly supply power to the electronic apparatus 200, the power supply apparatus 100 may affect the other apparatus from the wireless power supply to the electronic apparatus 200. Further, if the other apparatus is not configured to be able to receive wireless power supply from the power supply apparatus 100, the other apparatus should be protected.

Therefore, if the number of power receiving apparatuses located in the predetermined range 300 increases (YES in step S403), the power supply apparatus 100 should authenticate the communication by the communication unit 106 again so as to become able to check the state of the apparatus newly placed in the predetermined range 300 and whether the apparatus newly placed in the predetermined range 300 is configured to be able to receive wireless power supply from the power supply apparatus 100.

Therefore, in step S405, the control unit 101 sets the re-authentication flag F stored in the memory 108 in such a manner that this flag is validated. When the re-authentication flag F is set so as to be validated, the control unit 101 performs control so as to perform the digital protocol again. If the reauthorization flag F is validated, the processing ends.

Figure 4:
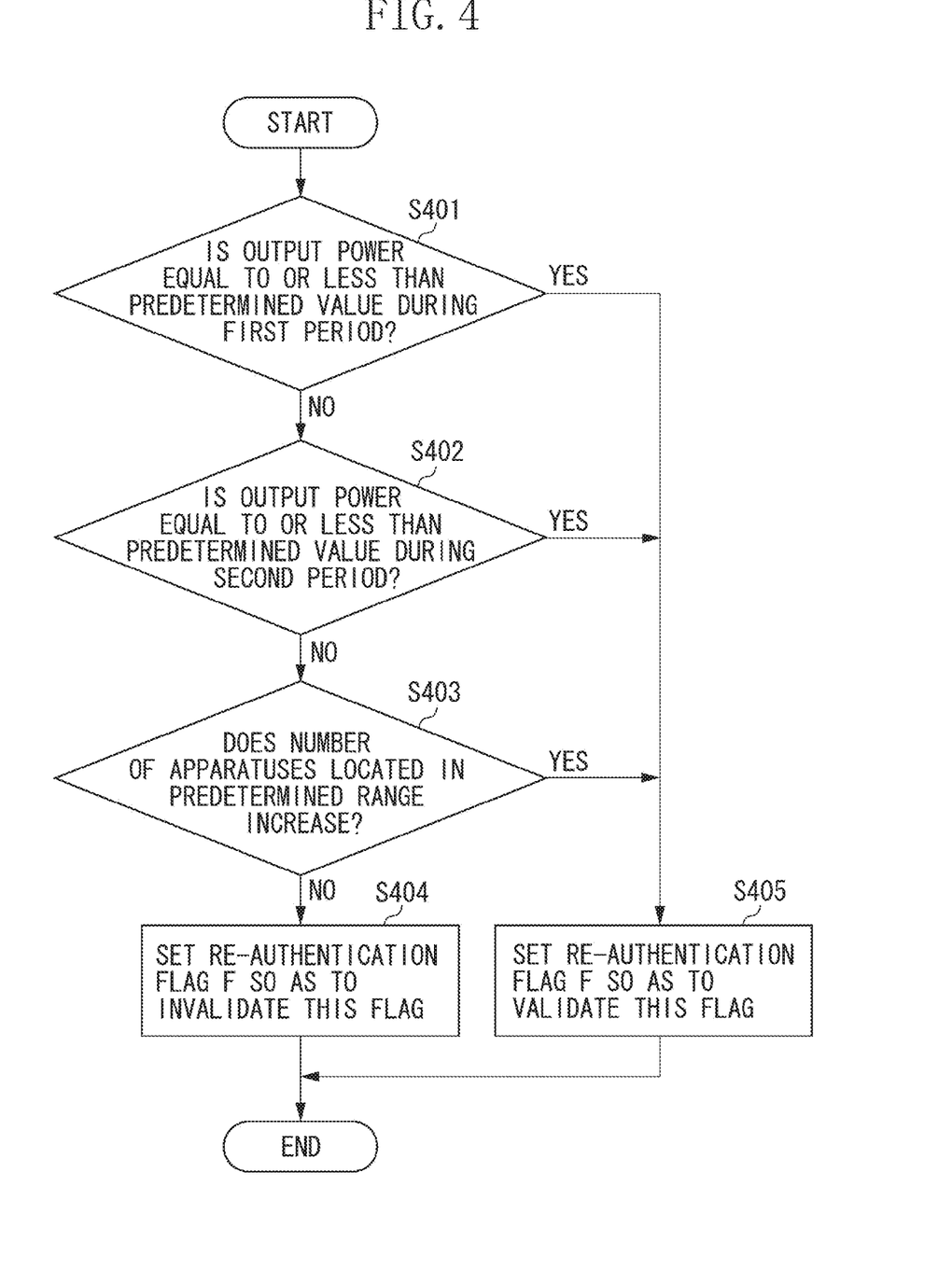
FIG. 4 is a flowchart illustrating an example of control processing according to the first exemplary embodiment.

Even after the end of the control process illustrated in FIG. 4, the control unit 101 periodically performs the control processing illustrated in FIG. 4 as long as the power supply apparatus 100 is in the power supply mode.

<Power Supply Control Process>

Figure 5:
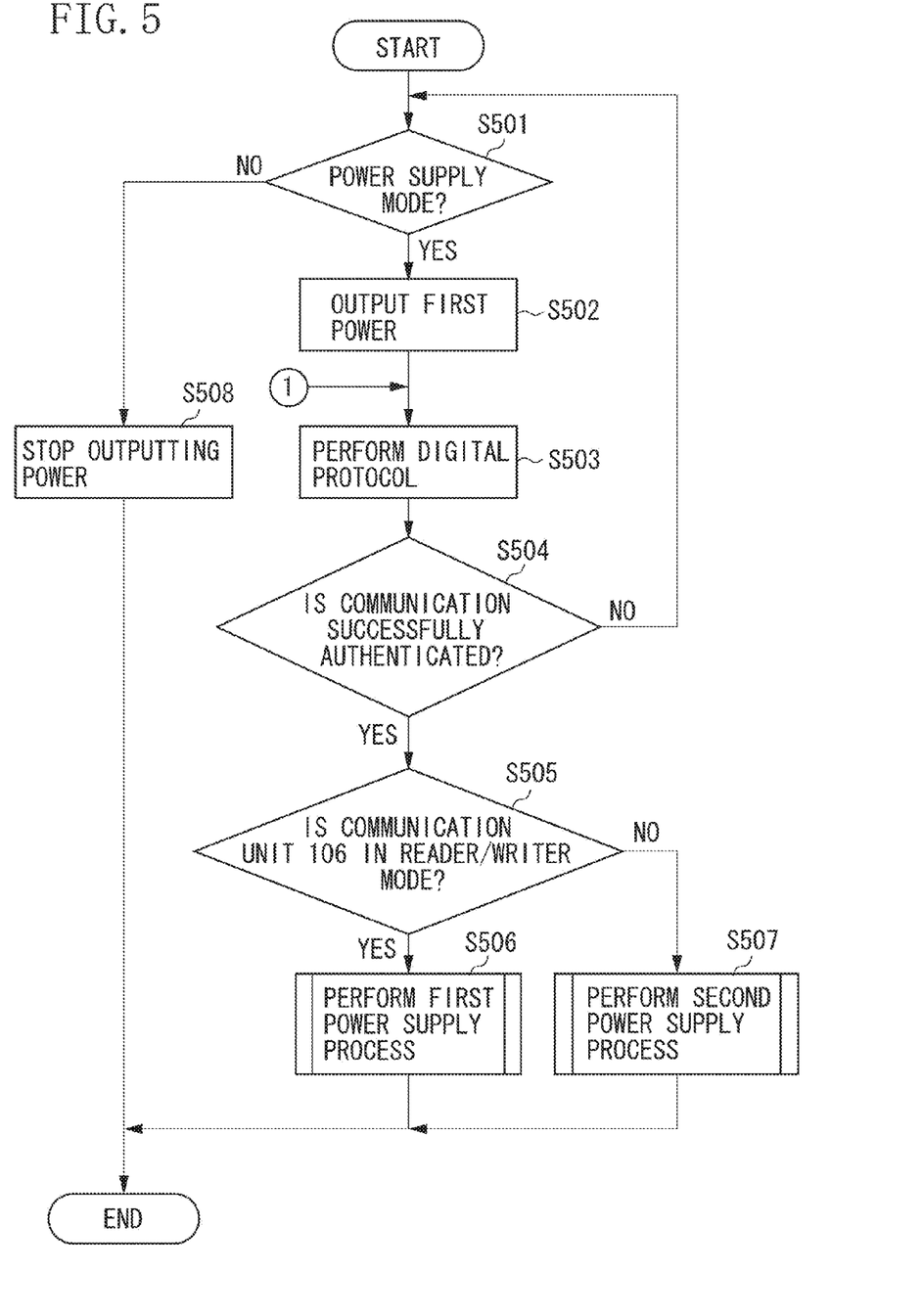
FIG. 5 is a flowchart illustrating an example of power supply control processing according to the first exemplary embodiment.

Next, power supply control process performed by the power supply apparatus 100 according to the first exemplary embodiment will be described with reference to FIG. 5.

The control unit 101 executes the computer program stored in the memory 108, by which the power supply control process can be realized. When the power supply control process illustrated in FIG. 5 is performed, the communication mode of the communication unit 106 is set to any one of the Reader/Writer mode and the P2P mode.

In step S501, the control unit 101 determines whether the power supply apparatus 100 is in the power supply mode. If the power supply apparatus 100 is in the power supply mode (YES in step S501), the process proceeds to step S502. If the power supply apparatus 100 is not in the power supply mode (NO in step S501), the process proceeds to step S508.

In step S502, the control unit 101 controls the power supply unit 102 to output the first power via the power supply antenna 107. In this case, the process proceeds to step S503.

In step S503, the control unit 101 performs the digital protocol. The digital protocol includes a process for determining whether there is a power receiving apparatus that supports the NFC standard in the predetermined range 300, and a process for determining whether the power receiving apparatus that supports the NFC standard is ready for a start of communication according to the NFC standard. For example, if the power supply apparatus 100 succeeds in authenticating communication by the digital protocol together with the electronic apparatus 200, this allows the communication unit 106 to transmit and receive data according to the NDEF format to and from the communication unit 206.

For example, if the process of S503 is performed after the electronic apparatus 200 is placed in the predetermined range 300, the communication unit 106 transmits first data for inquiring whether there is a power receiving apparatus that supports the NFC standard. If the electronic apparatus 200 receives the first data, the electronic apparatus 200 transmits data indicating that there is a power receiving apparatus that supports the NFC standard to the power supply apparatus 100 as response data. However, if there is a power receiving apparatus that does not support the NFC standard in the predetermined range 300, this apparatus does not receive the first data. Alternatively, if there is a power receiving apparatus that does not support the NFC standard in the predetermined range 300, this apparatus does not transmit the response data indicating that there is a power receiving apparatus that supports the NFC standard to the power supply apparatus 100 even if this apparatus receives the first data. Therefore, the control unit 101 determines whether there is a power receiving apparatus that supports the NFC standard in the predetermined range 300 according to the response data received by the communication unit 106. Further, the control unit 101 determines whether there is a power receiving apparatus that supports the NFC standard in the predetermined range 300 according to whether the communication unit 106 receives the response data in response to the first data. If the communication unit 106 receives the response data indicating that there is a power receiving apparatus that supports the NFC standard from the electronic apparatus 200, the control unit 101 determines that there is a power receiving apparatus that supports the NFC standard in the predetermined range 300.

Then, the communication unit 106 transmits second data for inquiring whether the electronic apparatus 200 is ready for a start of communication according to the NFC standard to the electronic apparatus 200. If the electronic apparatus receives the second data, the electronic apparatus 200 transmits data indicating that the electronic apparatus 200 is ready for a start of communication according to the NFC standard to the power supply apparatus 100 as response data if the electronic apparatus 200 detects that activation of the communication unit 206 is completed. However, even when the electronic apparatus 200 receives the second data, the electronic apparatus 200 does not transmit the data indicating that the electronic apparatus 200 is ready for a start of communication according to the NFC standard to the power supply apparatus 100 as the response data if the electronic apparatus 200 detects that activation of the communication unit 206 is not completed yet. Further, even when the electronic apparatus 200 receives the second data, the electronic apparatus 200 does not transmit the data indicating that the electronic apparatus 200 is ready for a start of communication according to the NFC standard to the power supply apparatus 100 as the response data if the electronic apparatus 200 detects that an error occurs at the communication unit 206.

Therefore, the control unit 101 determines whether the electronic apparatus 200 is ready for a start of communication according to the NFC standard based on the response data from the electronic apparatus 200. Further, the control unit 101 determines whether the electronic apparatus 200 is ready for a start of communication according to the NFC standard based on whether the communication unit 106 receives the response data in response to the second data. If the communication unit 106 receives the response data indicating that the electronic apparatus 200 is ready for a start of communication according to the NFC standard, the control unit 101 determines that there is a power receiving apparatus that supports the NFC standard in the predetermined range 300, and this power receiving apparatus is ready for a start of communication according to the NFC standard.

If the digital protocol is performed, the process proceeds to step S504.

In step S504, the control unit 101 determines whether the communication is successfully authenticated by the digital protocol as a result of the execution of the digital protocol.

The control unit 101 determines that the communication is successfully authenticated by the digital protocol if a power receiving apparatus that supports the NFC standard is detected in the predetermined range 300, and the power receiving apparatus located in the predetermined range 300 is detected to be ready for a start of communication according to the NFC standard. The control unit 101 determines that the communication is not successfully authenticated by the digital protocol if a power receiving apparatus that supports the NFC standard is not detected in the predetermined range 300. Further, the control unit 101 determines that the communication is not successfully authenticated by the digital protocol if a power receiving apparatus that supports the NFC standard is detected in the predetermined range 300 but this power receiving apparatus is detected to be unready for a start of communication according to the NFC standard.

If the communication is successfully authenticated by the digital protocol (YES in step S504), the process proceeds to step S505. If the communication is not successfully authenticated by the digital protocol (NO in step S504), the process returns to step S501. If the communication is not successfully authenticated by the digital protocol (NO in step S504), the control unit 101 controls the power supply unit 102 not to output the second power via the power supply antenna 107 until the communication is successfully authenticated by the digital protocol. When there is a plurality of apparatuses detected in the predetermined range 300, the process proceeds to step S505 if the communication is successfully authenticated by the digital protocol for all of the apparatuses detected in the predetermined range 300. If the communication is not successfully authenticated by the digital protocol for at least one of all of the apparatuses detected in the predetermined range 300, the process returns to S501.

If the communication is successfully authenticated by the digital protocol (YES in step S504), this allows the communication unit 106 to transmit and receive data according to the NDEF format as long as the communication mode is any one of the Reader/Writer mode and the P2P mode.

In step S505, the control unit 101 determines whether the current communication mode of the communication unit 106 is the Reader/Writer mode. If the communication mode of the communication unit 106 is the Reader/Writer mode (YES in step S505), the process proceeds to step S506. If the communication mode of the communication unit 106 is not the Reader/Writer mode (NO in step S505), this means that the current communication mode of the communication unit 106 is the P2P mode. In this case (NO in step S505), the process proceeds to S507.

In step S506, the control unit 101 performs first power supply process that will be described below. If the first power supply process is performed, the process ends.

In step S507, the control unit 101 performs second power supply process that will be described below. If the second power supply process is performed, the process ends.

In step S508, the control unit 101 controls the power supply unit 102 to stop outputting power via the power supply antenna 107. In this case, the process ends.

<First Power Supply Process>

Figure 6:
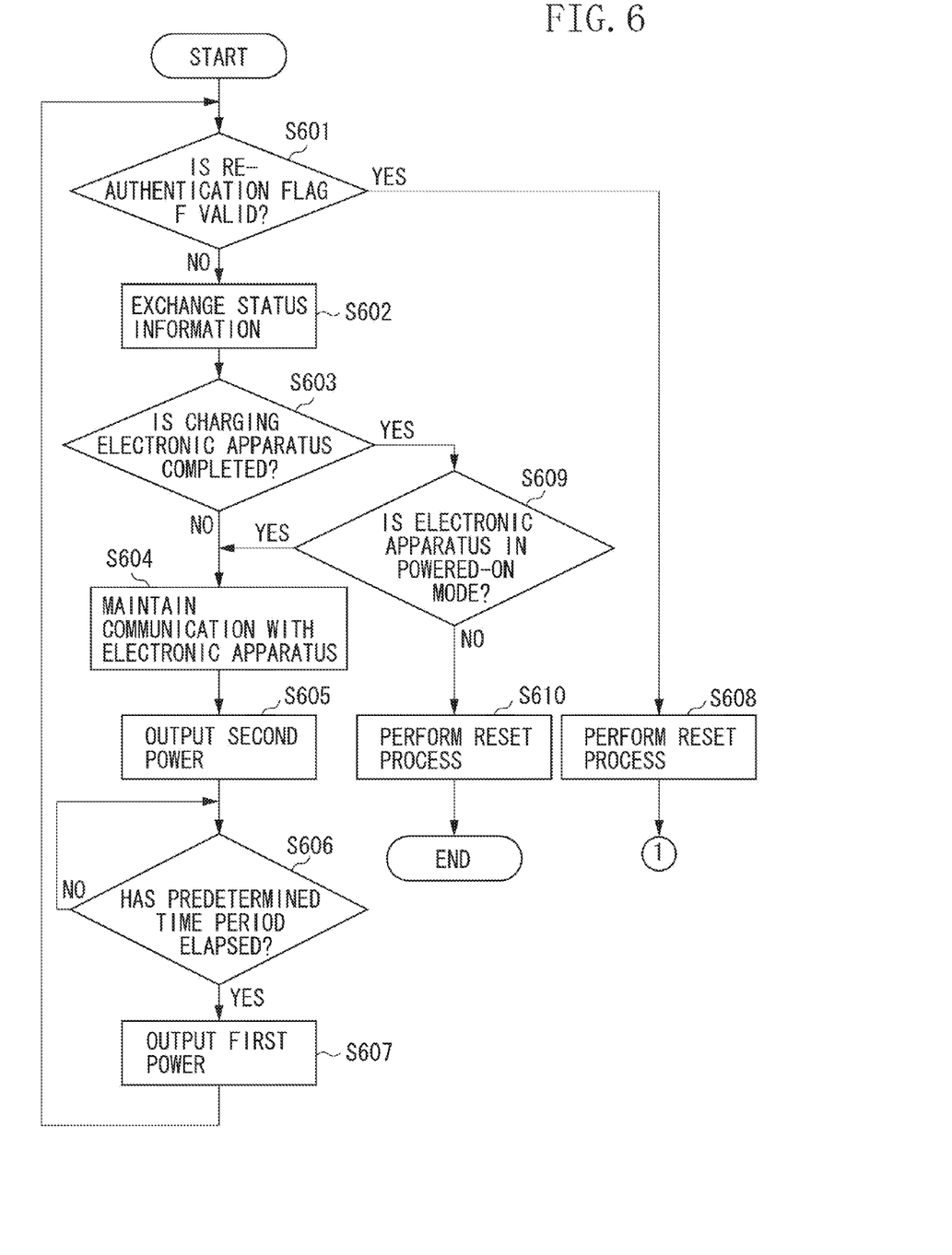
FIG. 6 is a flowchart illustrating an example of first power supply processing according to the first exemplary embodiment.

Next, the first power supply process performed by the power supply apparatus 100 in step S506 according to the first exemplary embodiment will be described with reference to FIG. 6. The control unit 101 executes the computer program stored in the memory 108, by which the first power supply process can be realized. When the first power supply process illustrated in FIG. 6 is performed, the communication mode of the communication unit 106 is set to the Reader/Writer mode.

Now, the first power supply process illustrated in FIG. 6 will be described based on an example in which this process is performed when the electronic apparatus 200 is located in the predetermined range 300 as illustrated in FIG. 1, and the communication is successfully authenticated by the digital protocol between the communication unit 106 and the electronic apparatus 200.

In step S601, the control unit 101 determines whether the re-authentication flag F stored in the memory 108 is valid. If the re-authentication flag F is valid (YES in step S601), the control unit 101 determines that the digital protocol has to be performed again. Then, the process proceeds to step S608. If the re-authentication flag F is not valid (NO in step S601), the control unit 101 determines that the digital protocol does not have to be performed again. Then, the process proceeds to step S602.

In step S602, the control unit 101 controls the communication unit 106 to transmit data for writing status information of the power supply apparatus 100 into the electronic apparatus 200 to the electronic apparatus, and controls the communication unit 106 to transmit data for reading out status information of the electronic apparatus 200 from the electronic apparatus 200 to the electronic apparatus.

The status information of the power supply apparatus 100 is information indicating a power supply capability of the power supply apparatus 100 and a state of the power supply apparatus 100. For example, the status information of the power supply apparatus 100 includes information indicating a maximum value of power that the power supply apparatus 100 can output, information indicating the resonance frequency of the power supply antenna 107, information indicating a level of the second power, information indicating whether the power supply apparatus 100 starts outputting the second power, and the like. The status information of the power supply apparatus 100 is data according to the NDEF format.

The status information of the electronic apparatus 200 is information indicating a power receiving capability of the electronic apparatus 200, a state of the electronic apparatus 200, and a state of the battery 211. For example, the status information of the electronic apparatus 200 includes information indicating a maximum value of power that the electronic apparatus 200 can receive, information indicating the resonance frequency of the power receiving antenna 203, information indicating a level of power received by the electronic apparatus 200 from the power supply apparatus 100, information relating to an operation mode of the electronic apparatus 200, information indicating the remaining capacity in the battery 211, and the like. The status information of the electronic apparatus 200 is data according to the NDEF format.

The status information of the electronic apparatus 200, which is read out from the electronic apparatus 200 by the communication unit 106, is stored into the memory 108.

After the status information of the power supply apparatus 100 is written into the electronic apparatus 200, and the status information of the electronic apparatus 200 is read out, the process proceeds to step S603.

In step S603, the control unit 101 determines whether charging the battery 211 by the electronic apparatus 200 is completed with use of the status information of the electronic apparatus 200, which is acquired from the electronic apparatus 200 in step S602. If charging the battery 211 is completed (YES in step S603), the process proceeds to step S609. If charging the battery 211 is not completed yet (NO in step S603), the process proceeds to step S604.

In step S604, the control unit 101 controls the communication unit 106 to continue the communication between the communication unit 106 and the electronic apparatus 200. In this case, the processing proceeds to step S605.

In step S605, the control unit 101 controls the power supply unit 102 so that the power to be output via the power supply antenna 107 is switched from the first power to the second power, and controls the power supply unit 102 to output the second power via the power supply antenna 107. For example, the second power is set by the control unit 101 with use of the status information of the electronic apparatus 200, which is received by the communication unit 106 from the electronic apparatus 200. Further, the control unit 101 controls a timer 101a to measure a time period elapsed since an output of the second power is started via the power supply antenna 107. In this case, the process proceeds to step S606.

In step S606, the control unit 101 detects whether the time period measured by the timer 101a is longer than or equal to a predetermined time period. If the time period measured by the timer 101a is longer than or equal to the predetermined time period (YES in step S606), the process proceeds to step S607. If the time period measured by the timer 101a is not longer than or equal to the predetermined time period (NO in step S606), the process of S606 is repeated.

In step S607, the control unit 101 controls the power supply unit 102 so that the power to be output via the power supply antenna 107 is switched from the second power to the first power, and controls the power supply unit 102 to output the first power via the power supply antenna 107. In this case, the process returns to step S601.

In step S608, the control unit 101 performs a reset process to disconnect the communication between the communication unit 106 and the electronic apparatus 200. The reset process is, for example, a process for deleting the data acquired by the communication unit 106 from the electronic apparatus 200 from the memory 108, and deleting the settings relating to the electronic apparatus 200. Further, the reset process includes a process for resetting the setting of the re-authentication flag F stored in the memory 108. If the reset process is performed, the process illustrated in this flowchart ends. Then, referring back to FIG. 5, the process illustrated in FIG. 5 proceeds to step S503, in which the digital protocol is performed again.

In step S609, the control unit 101 determines whether the electronic apparatus 200 is in the powered-on mode with use of the status information of the electronic apparatus 200, which is acquired from the electronic apparatus 200 in step S602. When the electronic apparatus 200 is in the powered-on mode, the electronic apparatus 200 needs power to be supplied to the load unit 209 even after the battery 211 is fully charged. Therefore, if the electronic apparatus 200 is in the powered-on mode (YES in step S609), the process proceeds to step S604 because the control unit 101 determines that the power supply apparatus 100 has to continuously supply power for an operation of the load unit 209 to the electronic apparatus 200. If the electronic apparatus 200 is not in the powered-on mode (NO in step S609), the process proceeds to step S610 because the control unit 101 determines that the power supply apparatus 100 does not have to continuously supply power to the electronic apparatus 200.

In step S610, the control unit 101 performs a similar process to step S608. In this case, the process ends.

<Second Power Supply Process>

Figure 7:
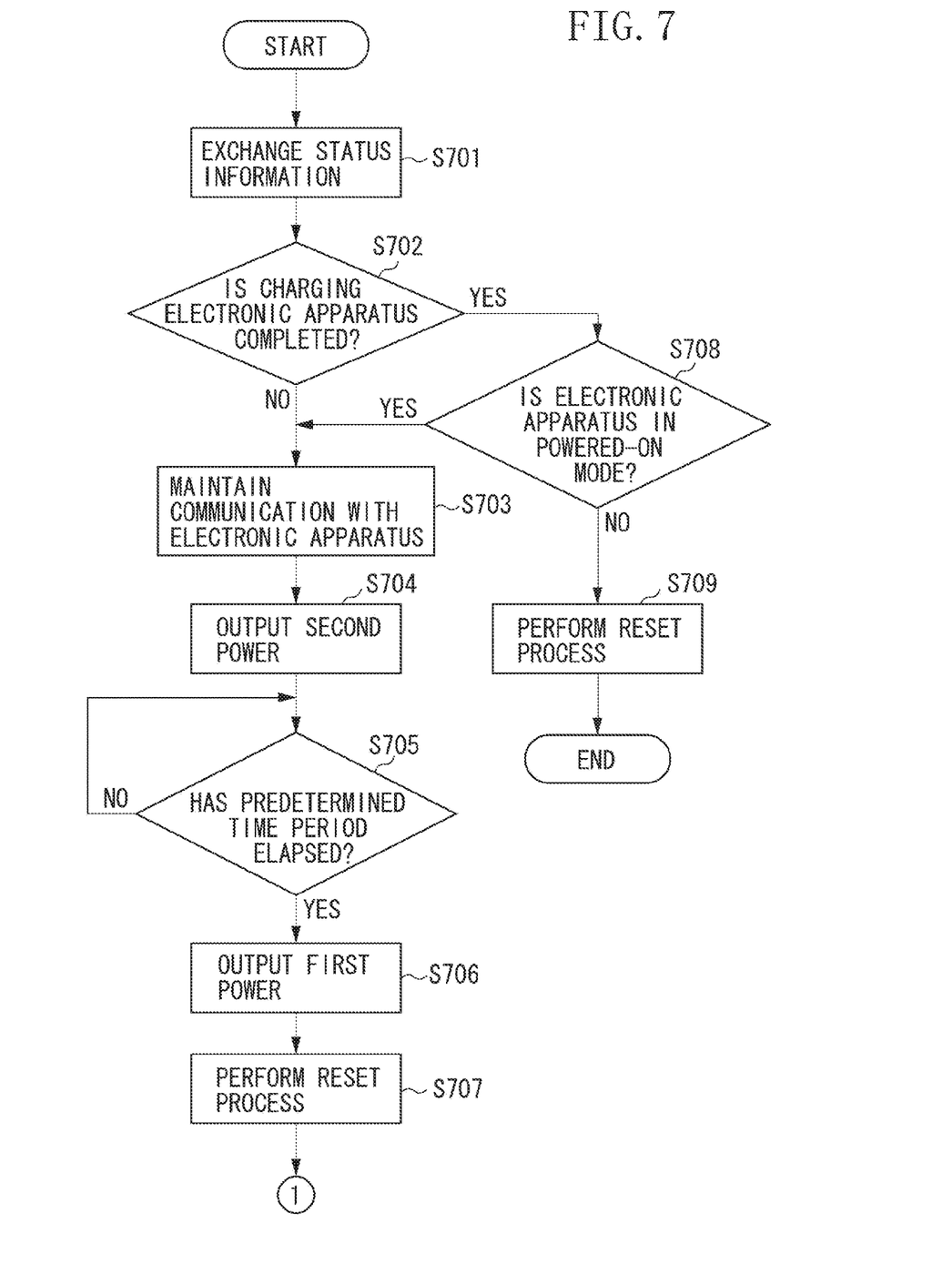
FIG. 7 is a flowchart illustrating an example of second power supply processing according to the first exemplary embodiment.

Next, the second power supply process performed by the power supply apparatus 100 in step S507 according to the first exemplary embodiment will be described with reference to FIG. 7. The control unit 101 executes the computer program stored in the memory 108, by which the second power supply process can be realized. When the second power supply process illustrated in FIG. 7 is performed, the communication mode of the communication unit 106 is set to the P2P mode.

Now, the second power supply process illustrated in FIG. 7 will be described based on an example in which this process is performed when the electronic apparatus 200 is located in the predetermined range 300 as illustrated in FIG. 1, and the communication is successfully authenticated by the digital protocol between the communication unit 106 and the electronic apparatus 200.

In step S701, the control unit 101 performs a similar process to step S602.

After the status information of the power supply apparatus 100 is written into the electronic apparatus 200, and the status information of the electronic apparatus 200 is read out, the process proceeds to step S702.

In step S702, the control unit 101 determines whether charging the battery 211 by the electronic apparatus 200 is completed with use of the status information of the electronic apparatus 200, which is acquired from the electronic apparatus 200 in step S701, in a similar manner to step S603. If charging the battery 211 is completed (YES in step S702), the process proceeds to step S708. If charging the battery 211 is not completed yet (NO in step S702), the process proceeds to step S703.

In step S703, the control unit 101 controls the communication unit 106 to continue the communication between the communication unit 106 and the electronic apparatus 200 in a similar manner to step S604. In this case, the process proceeds to step S704.

In step S704, the control unit 101 performs a similar process to step S605. In this case, the process proceeds to step S705.

In step S705, the control unit 101 detects whether the time period measured by the timer 101a is longer than or equal to the predetermined time period in a similar manner to step S606. If the time period measured by the timer 101a is longer than or equal to the predetermined time period (YES in step S705), the process proceeds to step S706. If the time period measured by the timer 101a is not longer than or equal to the predetermined time period (NO in step S705), the process of step S705 is repeated.

In step S706, the control unit 101 controls the power supply unit 102 so that the power to be output via the power supply antenna 107 is switched from the second power to the first power. In this case, the process proceeds to step S707.

In step S707, the control unit 101 performs a similar process to step S608. In this case, the process illustrated in this flowchart ends. Then, referring back to FIG. 5, the process illustrated in FIG. 5 proceeds to step S503, in which the digital protocol is performed again.

In step S708, the control unit 101 determines whether the electronic apparatus 200 is in the powered-on mode with use of the status information of the electronic apparatus 200, which is acquired from the electronic apparatus 200 in step S701, in a similar manner to step S609. When the electronic apparatus 200 is in the powered-on mode, the electronic apparatus 200 needs power to be supplied to the load unit 209 even after the battery 211 is fully charged. Therefore, if the electronic apparatus 200 is in the powered-on mode (YES in step S708), the process proceeds to step S703 because the control unit 101 determines that the power supply apparatus 100 has to continuously supply power for an operation of the load unit 209 to the electronic apparatus 200. If the electronic apparatus 200 is not in the powered-on mode (NO in step S708), the process proceeds to step S709 because the control unit 101 determines that the power supply apparatus 100 does not have to continuously supply power to the electronic apparatus 200.

In step S709, the control unit 101 performs a similar process to step S608. In this case, the process ends.

In this manner, the power supply apparatus 100 according to the first exemplary embodiment is configured to authenticate the communication by the communication unit 106 again when the power output from the power supply antenna 107 is less than or equal to the predetermined value during the first period. Further, the power supply apparatus 100 is configured to authenticate the communication by the communication unit 106 again when the power output from the power supply antenna 107 is less than or equal to the predetermined value during the second period. As a result, the power supply apparatus 100 automatically causes the communication unit 106 to authenticate the communication with the electronic apparatus 200 when the communication unit 106 cannot continuously communicate with the electronic apparatus 200, thereby succeeding in appropriately wirelessly supplying power to the electronic apparatus 200 with use of a result of the communication between the communication unit 106 and the electronic apparatus 200.

Further, the power supply apparatus 100 is configured to authenticate the communication by the communication unit 106 again when the number of apparatuses located in the predetermined range 300 increases. As a result, when an apparatus is newly placed in the predetermined range 300, the power supply apparatus 100 automatically causes the communication unit 106 to authenticate communication with the newly placed apparatus. Therefore, the power supply apparatus 100 can appropriately wirelessly supply power to the existing electronic apparatus 200 while checking a state of the newly placed apparatus. Accordingly, when the power supply apparatus 100 detects that the newly placed apparatus is in a state that prevents the apparatus from receiving power from the power supply apparatus 100, the power supply apparatus 100 can protect the newly placed apparatus by limiting the wireless power supply to the existing electronic apparatus 200. The state that prevents the apparatus from receiving power from the power supply apparatus 100 is, for example, such a state that a battery of the newly placed apparatus is fully charged, or such a state that the newly placed apparatus is unready for a start of wireless communication with the power supply apparatus 100.

Further, the power supply apparatus 100 can check whether the newly placed apparatus is configured to be able to receive wireless power supply from the power supply apparatus 100 by authenticating the communication with the newly placed apparatus. Therefore, if the newly placed apparatus is not a power receiving apparatus that supports the NFC standard, the newly placed apparatus is determined to be unable to receive wireless power supply from the power supply apparatus 100. In this case, the power supply apparatus 100 can protect the newly placed apparatus by limiting the wireless power supply to the existing electronic apparatus 200.

If the power supply apparatus 100 confirms that the newly placed apparatus is configured to be able to receive wireless power supply from the power supply apparatus 100, and is ready for receiving power from the power supply apparatus 100 by authenticating the communication with the newly placed apparatus, the power supply apparatus 100 can wirelessly supply power to the newly placed apparatus and the electronic apparatus 200 while checking the states of the newly placed apparatus and the electronic apparatus 200.

Further, when the communication between the electronic apparatus 200 already existing in the predetermined range 300 and the communication unit 106 is authenticated again, the power supply apparatus 100 may omit a part of the communication between the electronic apparatus 200 and the communication unit 106. For example, the power supply apparatus 100 may refrain from transmitting invariable information in the status information of the power supply apparatus 100 to the electronic apparatus 200 but transmit variable information in the status information of the power supply apparatus 100 to the electronic apparatus 200. The invariable information in the status information of the power supply apparatus 100 is, for example, the information indicating the maximum value of power that the power supply apparatus 100 can output, and the information indicating the resonance frequency of the power supply antenna 107. Further, the variable information in the status information of the power supply apparatus 100 is, for example, the information indicating the level of the second power, and the information indicating whether the power supply apparatus 100 starts outputting the second power. As a result, the power supply apparatus 100 can be prevented from redundantly transmitting information already transmitted to the electronic apparatus 200 after the communication between the electronic apparatus 200 and the communication unit 106 is authenticated for the first time to the electronic apparatus 200.

Further, for example, when the communication between the electronic apparatus 200 already existing in the predetermined range 300 and the communication unit 106 is authenticated again, the power supply apparatus 100 may refrain from acquiring invariable information in the status information of the electronic apparatus 200 from the electronic apparatus 200, but acquire variable information in the status information of the electronic apparatus 200 from the electronic apparatus 200. The invariable information in the status information of the electronic apparatus 200 is, for example, the information indicating the maximum value of power that the electronic apparatus 200 can receive, and the information indicating the resonance frequency of the power receiving antenna 203. Further, the variable information in the status information of the electronic apparatus 200 is, for example, the information indicating the level of power received by the electronic apparatus 200 from the power supply apparatus 100, the information relating to the operation mode of the electronic apparatus 200, and the information indicating the remaining capacity in the battery 211.

If the power supply apparatus 100 refrains from acquiring the invariable information in the status information of the electronic apparatus 200 from the electronic apparatus 200 after the communication between the electronic apparatus 200 already existing in the predetermined range 300 and the communication unit 106 is authenticated again, in step S608, the control unit 101 deletes the variable information in the status information of the electronic apparatus 200 from the memory 108, but refrains from deleting the invariable information in the status information of the electronic apparatus 200 from the memory 108. Further, if the power supply apparatus 100 refrains from acquiring the invariable information in the status information of the electronic apparatus 200 from the electronic apparatus 200 after the communication between the electronic apparatus 200 already existing in the predetermined range 300 and the communication unit 106 is authenticated again, steps S610, S707, and S709 are also performed in a similar manner to step S608.

As a result, the power supply apparatus 100 can be prevented from redundantly acquiring information already acquired from the electronic apparatus 200 after the communication between the electronic apparatus 200 and the communication unit 106 is authenticated for the first time from the electronic apparatus 200.

Therefore, the power supply apparatus 100 according to the first exemplary embodiment can control a timing at which the communication with the power receiving apparatus is authenticated, thereby realizing appropriate execution of the communication that allows the power supply apparatus 100 to control the wireless power supply.

In the first exemplary embodiment, the power supply apparatus 100 supplies the second power to the electronic apparatus 200 with use of the power supply antenna 107, and performs communication between the communication unit 106 and the electronic apparatus 200 with use of the power supply antenna 107. However, configuration is not seen to be limiting. For example, even if the power supply apparatus 100 is configured to separately include an antenna for supplying the second power to the electronic apparatus 200 and an antenna for performing communication between the communication unit 106 and the electronic apparatus 200, the power supply apparatus 100 can acquire an effect similar to the above-described effect by performing the process illustrated in FIGS. 4 to 7.

Further, the electronic apparatus 200 receives power from the power supply apparatus 100 with use of the power receiving antenna 203, and performs communication between the power supply apparatus 100 and the communication unit 206 with use of the power receiving antenna 203. However, this configuration is not seen to be limiting. For example, the electronic apparatus 200 may be configured to separately include an antenna for receiving power from the power supply apparatus 100, and an antenna for performing communication between the power supply apparatus 100 and the communication unit 206.

The first exemplary embodiment has been described assuming that the communication unit 106 performs proximity wireless communication, but the term "proximity wireless communication" may be replaced with the term "short-range wireless communication".

In step S401, the control unit 101 determines whether the power output from the power supply antenna 107 during the first period is less than or equal to the predetermined value with use of the data provided from the power detection unit 111. However, this configuration is not seen to be limiting. For example, in step S401, the control unit 101 may determine whether the power output from the power supply antenna 107 during the first period is less than or equal to the predetermined value according to whether control for adjusting the power output from the power supply antenna 107 to the predetermined value or lower is performed during the first period. In this case, if the control for adjusting the power output from the power supply antenna 107 to the predetermined value or lower is performed during the first period, the control unit 101 determines that the power output from the power supply antenna 107 is less than or equal to the predetermined value during the first period (YES in step S401). Further, if the control for adjusting the power output from the power supply antenna 107 to the predetermined value or lower is not performed during the first period, the control unit 101 determines that the power output from the power supply antenna 107 is not less than or equal to the predetermined value during the first period (NO in step S401).

In step S402, the control unit 101 determines whether the power output from the power supply antenna 107 during the second period is less than or equal to the predetermined value with use of the data provided from the power detection unit 111. However, this configuration is not seen to be limiting. For example, in step S402, the control unit 101 may determine whether the power output from the power supply antenna 107 during the second period is less than or equal to the predetermined value according to whether the control for adjusting the power output from the power supply antenna 107 to the predetermined value or lower is performed during the second period. In this case, if the control for adjusting the power output from the power supply antenna 107 to the predetermined value or lower is performed during the second period, the control unit 101 determines that the power output from the power supply antenna 107 is less than or equal to the predetermined value during the second period (YES in step S402). Further, if the control for adjusting the power output from the power supply antenna 107 to the predetermined value or lower is not performed during the second period, the control unit 101 determines that the power output from the power supply antenna 107 is not less than or equal to the predetermined value during the second period (NO in step S402).

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A power supply apparatus comprising:
a power supply unit that wirelessly supplies power to an electronic apparatus;
a communication unit that performs wireless communication for acquiring status information from the electronic apparatus;
a detection unit that detects an external apparatus different from the electronic apparatus; and
a control unit that performs control so that the wireless communication is repeatedly performed with the electronic apparatus, after performing authentication via the communication unit,
wherein the control unit performs the authentication again in a case where timing at which communication is to be performed with the electronic apparatus via the communication unit comes in a state that the external apparatus different from the electronic apparatus is newly detected by the detection unit after the power supply unit starts wirelessly supplying power, and
wherein the control unit does not perform the authentication again in a case where timing at which communication is to be performed with the electronic apparatus via the communication unit comes in a state that the electronic apparatus different from the electronic apparatus is not newly detected by the detection unit after the power supply unit starts wirelessly supplying power.

2. The power supply apparatus according to claim 1, wherein
the control unit does not perform the authentication again but communicates with the electronic apparatus via the communication unit in a case where timing at which communication is to be performed with the external apparatus via the communication unit comes in a state that the external apparatus different from the electronic apparatus is not newly detected by the detection unit after the power supply unit starts wirelessly supplying power.

3. The power supply apparatus according to claim 1, wherein the control unit performs control so that communication by the communication unit and power supply by the power supply unit are alternately performed.

4. The power supply apparatus according to claim 3, wherein the control unit determines power to be output for power supply to be performed next by the power supply unit based on information received from the electronic apparatus through the communication by the communication unit.

5. The power supply apparatus according to claim 1, wherein the control unit controls whether to perform the authentication again when the timing at which the communication is to be performed via the communication unit comes according to whether power to be output by the power supply unit is equal to or smaller than a predetermined value.

6. The power supply apparatus according to claim 1, wherein the control unit controls whether to perform the authentication again when the timing at which the communication is to be performed via the communication unit comes according to remaining power in a battery to be connected to the electronic apparatus.

7. The power supply apparatus according to claim 1, wherein the control unit controls whether to perform the authentication again when the timing at which the communication is to be performed via the communication unit comes according to an operation mode of the electronic apparatus.

8. The power supply apparatus according to claim 1, wherein the communication unit performs communication based on Near Field Communication (NFC).

9. A method for a power supply apparatus having a communication unit that communicates with an electronic apparatus and a power supply unit that supplies power to the electronic apparatus, the method comprising:
performing, via the communication unit, wireless communication for acquiring status information from the electronic apparatus;
detecting an external apparatus different from the electronic apparatus; and
performing control so that the wireless communication is repeatedly performed with the electronic apparatus, after performing authentication via the communication unit,
wherein the authentication is performed again in a case where timing at which communication is to be performed with the electronic apparatus comes in a state that the external apparatus different from the electronic apparatus is newly detected after the power supply unit starts wirelessly supplying power, and
wherein the authentication is not performed again in a case where timing at which communication is to be performed with the electronic apparatus comes in a state that the external apparatus different from the electronic apparatus is not newly detected after the power supply unit starts wirelessly supplying power.

10. A non-transitory computer-readable storage medium which stores a program for causing a power supply apparatus having a communication unit that communicates with an electronic apparatus and a power supply unit that supplies power to the electronic apparatus to execute a method, the method comprising:
performing, via the communication unit, wireless communication for acquiring status information from the electronic apparatus;
detecting an external apparatus different from the electronic apparatus; and
performing control so that the wireless communication is repeatedly performed with the electronic apparatus, after performing authentication via the communication unit,
wherein the authentication is performed again in a case where timing at which communication is to be performed with the electronic apparatus comes in a state that the external apparatus different from the electronic apparatus is newly detected after the power supply unit starts wirelessly supplying power, and
wherein the authentication is not performed again in a case where timing at which communication is to be performed with the external apparatus comes in a state that the external apparatus different from the electronic apparatus is not newly detected after the power supply unit starts wirelessly supplying power.

* * * * *